Patented Sept. 9, 1947

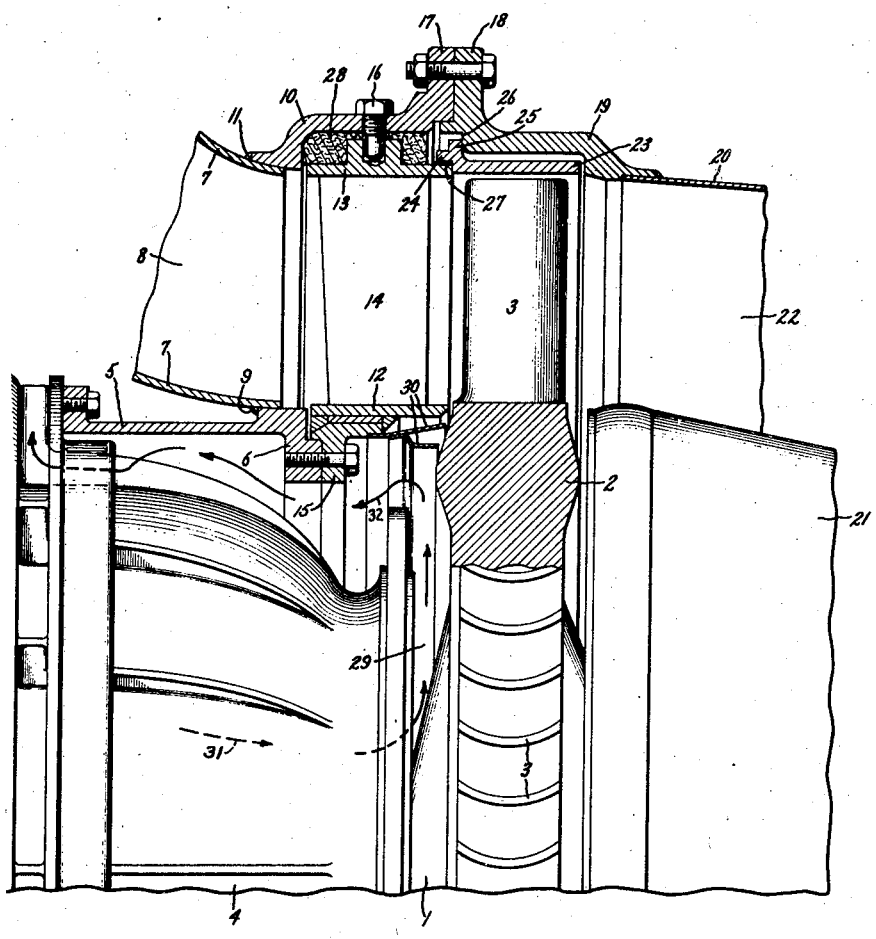
Inventor:
Donald F. Warner,
by Harry E. Dunham
His Attorney.

2,427,244

UNITED STATES PATENT OFFICE 2,427,244

GAS TURBINE

Donald F. Warner, Swampscott, Mass., assignor to General Electric Company, a corporation of New York Application March 7, 1944, Serial No. 525,388

2 Claims. (Cl. 253—39)

The present invention relates to gas turbines and especially to gas turbines operated by gases from a combustion chamber. For best efficiencies, such turbines are operated at high temperatures and at high speeds, temperatures and speeds so high that it is not practical to load the turbine buckets with the usual bucket cover on account of the added centrifugal stresses. Accordingly, the gas passages between the turbine buckets have been left open at their radial outer ends and to minimize leakage the buckets have been arranged to run with close clearance with a stationary shroud band surrounding the bucket wheel. In connection with such stationary shroud bands, difficulty has been experienced in keeping them from warping and in maintaining the desired close clearance, such difficulty being occasioned by the high temperatures of adjacent parts and the unevenness of such temperatures during operation.

One object of my invention is to provide an improved construction and arrangement of stationary shroud band which overcomes the difficulties heretofore met with in the use of such shroud bands.

A further object of my invention is to provide improved means which minimize leakage at the wheel rim.

Other objects of my invention and its advantages will appear from the following specification, and for a consideration of what I believe to be novel and my invention, attention is directed to the following specification and to the claims appended thereto.

Referring to the drawing, the figure is a sectional view of a part of a gas turbine embodying my invention.

Referring to the drawing, 1 indicates a turbine wheel having a rim 2 to which is attached a ring of turbine buckets 3. The buckets are fastened to the rim at their roots in any suitable manner. Their radial outer ends are free, being provided with neither an attached bucket cover nor with a tie wire or wires. The wheel is carried by a suitable shaft supported in bearings in a bearing housing 4. Connected to and carried by the bearing housing is an annular ring 5, the ring being provided with a flange 6 at its free end. Attached to ring 5 are walls 7 which define a passage or passages 8 for conveying gases from a combustion chamber or combustion chambers to a nozzle ring structure, which nozzle ring structure directs the gases to the buckets 3 of the turbine wheel. Walls 7 may represent the flattened discharge ends of a number of combustion chambers arranged circumferentially around the bearing housing 4, the flattened ends being directly adjacent each other so as to supply gases entirely around the periphery of the nozzle ring structure. It may be a combustion chamber arrangement, for example, such as that shown in the application of Dale D. Streid, Serial No. 525,-391 (docket No. 74,247), filed of even date herewith and assigned to the same assignee as the present application. The radial inner walls 7 of the gas discharge ends are shown as being attached to the free end of ring 5 by welding as is indicated at 9. The radial outer walls are attached to an annular ring 10 by suitable welding as is indicated at 11. Ring 10 surrounds the nozzle ring structure. The nozzle ring structure comprises inner and outer annular rings 12 and 13 between which are arranged the nozzle partitions 14, the nozzle partitions defining passages for directing gases to the turbine wheel as is well understood. Attached to inner nozzle ring 12 by suitable welding is an annular flange 15 which in turn is bolted to flange 6 on ring 5. The nozzle ring structure is positioned at its periphery by a number of circumferentially spaced pins 16, the inner ends of which engage openings in bosses formed integrally with outer ring 13, the openings being sufficiently large to permit of radial expansion of ring 13 with respect to ring 10. Attached to a flange 17 on ring 10 is a flange 18 carried by a ring 19 which forms a part of the turbine casing. Attached to ring 19 is an annular wall 20 which with an annular wall 21 defines an annular discharge passage 22 for the gases discharged from the turbine buckets.

Surrounding the ring of buckets is a stationary shroud ring 23 which is arranged in spaced relation to the inner surface of wall 19 and is supported on the right hand adjacent edge of nozzle ring 13 by a rabbeted connection comprising a flange 24 which surrounds an end of ring 13 and is centered by the ring. The end of ring 23 is positioned directly against the end of nozzle ring 13 and is held against it by means of a flange 25 on ring 23 which is engaged by a face 26 on ring 19. The flange 25, so-to-speak, is pinched between the end of ring 13 and face 26. A slight annular clearance is provided in the rabbeted joint as is indicated at 27. Thus, stationary shroud ring 23 is supported on the end of nozzle ring 13 and is free to move radially with such ring. Also, ring 23 is free to expand radially independently of ring 13 and casing 19. Between ring 13 and ring 10 is arranged suitable heat packing material 28.

Between the end of bearing housing 4 and wheel 1 is an annular space 29 through which air is circulated by any suitable means for cooling the turbine wheel. This cooling air flow is represented by arrows 31, 32. The details of the arrangement for providing this flow are not necessary to an understanding of the present invention, but may be as disclosed in an application, Serial No. 506,930, filed October 20, 1943, in the name of Alan Howard. It is desirable that leakage between space 29 and the space between inner nozzle ring 12 and rim 2 be reduced to a minimum. To this end, there is provided a pair of packing rings 30 which are connected to flange 15 by suitable means such as by welding. Packing rings 30 have a close running clearance with the adjacent surface of rim 2.

During operation, the nozzle structure comprising rings 12 and 13 and the nozzle partitions 14 are at a higher temperature than the turbine buckets 3, there being a drop in temperature of the gases as they flow through the nozzle ring structure. Axially extending ring 5 has a certain amount of flexibility and permits of some expansion of the nozzle ring structure as a whole. The shroud ring 23 is heated from the turbine buckets and from the gases passing through the turbine buckets and assumes a temperature about the same as that of the buckets, this being lower than the temperature of the nozzle ring structure. The small clearance 27 is sufficient to take care of the difference in expansion between the nozzle ring structure and shroud ring 23 due to the difference in running temperature between these parts. Aside from this, they are free to expand and contract together relative to casings 10 and 19. Also, as already pointed out, shroud ring 23 is free to expand and contract relatively to ring 13. It should be noted that the clearances as represented in the drawing exist when the structure is cold (not operating). When in operation, the parts heat up and expand so that the clearance between the left-hand edge of nozzle ring 13 and casing 10 closes up substantially or entirely, as does also the radial clearance between the right-hand edge of nozzle ring 13 and the rabbet formed by flange 24. On the other hand, the clearance between the right-hand edge of shroud 23 and the casing 19 remains open both when the parts are cold and when hot during operation. Thus it will be seen that when the parts are cold there may be some looseness in the supporting means for the shroud 23, but the design of the parts with their respective clearances is such that this looseness is not sufficient to permit the shroud to touch the tips of the buckets 3. When the parts heat up during operation, the nozzle ring 13 expands radially as described so that the shroud 23 is accurately located relative to the buckets by means of the rabbeted connection 24, 27, the inner nozzle ring 12 being fixedly secured to the relatively cool support flange 6. It should also be noted that a certain amount of hot gas will pass through the clearance space between the right-hand end of shroud 23 and the casing 19 and circulate in the annular chamber formed therebetween. Thus the shroud ring 23, which is of comparatively light cross section, has hot gas in contact with both its inner and its outer surface so that it will be maintained at a substantially uniform temperature. This temperature, however, is appreciably lower than the temperature of the outer nozzle ring 13, as described hereinbefore. With this arrangement, no strains are put on shroud ring 23 tending to warp it or throw it out of shape. Therefore, during operation it retains its shape and maintains the desired clearance between the ends of the buckets 3 and the inner surface of the shroud ring. It is to be noted that the packing rings 30 are carried by the nozzle ring structure which in turn is carried by the ring 5. This means that the annular fingers 30 move along with the nozzle ring structure when the parts expand. Thus, the packing rings maintain close clearance with the rim of the wheel when both the nozzle structure and the rim of the wheel expand radially. By the improved arrangement, leakage at both the roots and peripheries of the turbine buckets is maintained at a minimum under all operating conditions.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a high temperature turbine, a casing, a bearing housing supported within the casing, a turbine wheel with a shaft supported in the bearing housing and a circumferential row of shroudless buckets, nozzle means supported in the casing for suplying operating fluid to the buckets and including inner and outer rings connected by radially extending nozzle partitions, and stationary bucket shroud means comprising a ring surrounding the bucket tips with a small radial clearance therefrom, cooperating means on the shroud and casing supporting the shroud within the casing for radial movement, said shroud ring having a circumferential edge portion abutting against an adjacent edge of the outer nozzle ring and defining therewith a rabbeted joint for centering the shroud relative to the nozzle ring, said joint having a radial clearance space whereby the nozzle ring can freely expand and contract radially relative to the shroud ring.

2. In a high temperature turbine, a casing, a bearing housing supported within the casing, a turbine wheel with a shaft supported in the bearing housing, said wheel having a circumferential row of shroudless buckets, a nozzle ring structure supported in the casing and comprising inner and outer ring members connected by substantially radially extending partitions for supplying motive fluid to the buckets, and a shroud ring for the buckets, cooperating means on the shroud and casing supporting the shroud within the casing for radial movement, said shroud having an edge portion which abuts against an edge of the outer nozzle ring member and an axially extending flange which surrounds such edge to form a rabbeted joint to center the shroud ring on the nozzle ring, said joint having a radial clearance space whereby differential thermal expansion may take place between shroud and nozzle ring without setting up excessive stresses in the respective parts.

DONALD F. WARNER.

REFERENCES CITED

The following references are of record in the file of this patent:

UNITED STATES PATENTS

| Number | Name | Date |
|---|---|---|
| 2,225,769 | Conrad | Dec. 24, 1940 |

FOREIGN PATENTS

| Number | Country | Date |
|---|---|---|
| 354,888 | Great Britain | Apr. 2, 1931 |